United States Patent [19]

Tagami et al.

[11] 4,402,050
[45] Aug. 30, 1983

[54] APPARATUS FOR VISUALLY INDICATING CONTINUOUS TRAVEL ROUTE OF A VEHICLE

[75] Inventors: Katsutoshi Tagami, Asaki; Masao Sugimura, Niiza; Shinichiro Yasui, Wako; Tsuneo Takahashi, Saitama; Katsusuke Komuro, Chofu; Nobuhiko Suzuki, Tokyo, all of Japan

[73] Assignee: Honda Giken Kogyo Kabushiki Kaisha, Tokyo, Japan

[21] Appl. No.: 208,535

[22] Filed: Nov. 20, 1980

[30] Foreign Application Priority Data

Nov. 24, 1979 [JP] Japan .................................. 54-152290
Feb. 5, 1980 [JP] Japan .................................. 55-12605

[51] Int. Cl.³ .............................................. G06F 15/50
[52] U.S. Cl. ...................................... 364/460; 364/450
[58] Field of Search ............... 364/428, 450, 460, 521; 340/24, 27 AT, 27 NA; 343/112 PT

[56] References Cited

U.S. PATENT DOCUMENTS

| | | | |
|---|---|---|---|
| 3,382,351 | 5/1968 | Schweighofer et al. | 340/27 AT X |
| 3,538,313 | 11/1970 | Thomas et al. | 364/450 X |
| 3,789,198 | 1/1974 | Henson et al. | 364/460 X |
| 4,084,241 | 4/1978 | Tsumura | 364/460 |
| 4,086,632 | 4/1978 | Lions | 364/521 X |
| 4,139,889 | 2/1979 | Ingels | 364/460 |

*Primary Examiner*—Jerry Smith
*Attorney, Agent, or Firm*—Irving M. Weiner; Pamela S. Burt; John L. Shortley

[57] ABSTRACT

A vehicle travel route indicating apparatus comprising detectors for detecting current travel distance and bearing of a vehicle, respectively; a signal processor for obtaining a current location of the vehicle on two-dimensional coordinates; a memory for storing continuous locational information; a display for indicating a path of travel and a sense mark; and a manual selector for optionally changing the manner of visual indication settings. With such simplified construction, the driver of the vehicle can incessantly determine the status of travel of the vehicle in terms of both distance and bearing aspects during the travel by following the first-hand information displayed at his seat with greater ease and reliability.

3 Claims, 3 Drawing Figures

APPARATUS FOR VISUALLY INDICATING CONTINUOUS TRAVEL ROUTE OF A VEHICLE

BACKGROUND OF THE INVENTION

1. Field of the Invention

The present invention relates generally to a bearing and distance indicating unit for use in a vehicle. More particularly, the invention relates to a travel route indicating apparatus for use in an automotive vehicle or the like which is adapted to sequentially indicate travel conditions of the vehicle at any given moment, such as the current location, path of travel, direction of travel, etc.

2. Description of Relevant Art

In attempting to prevent the driver of an automotive vehicle or the like from becoming lost such as when driving at night or in unfamiliar places, there have been developed a variety of apparatus designed to indicate continuously or discretely a current location of the vehicle or similar information by way of an indication panel or display screen, including a related road map or the like, disposed adjacent the driver's seat. The driver is thus provided with ready guidance relating to the vehicle's status of travel at any given moment with respect to a desired course of travel.

The conventional travel route indicating apparatus is constructed such that a travelling distance of a vehicle at any given moment is detected in accordance with its speed of travel and time by a distance detecting section, a current bearing and the amount of azimuthal deviation of the vehicle at the given moment are detected by a bearing detecting section employing a rate gyroscope or the like adapted to detect a possible angular velocity produced about the axis of yawing of the vehicle, the location of the vehicle along its travel route at that moment is obtained from an arithmetic operation performed on the thus-detected data, and the results are indicated by way of spot information varying from time to time on a display which indicates a suitable road map of routes or roads on which the vehicle travels.

With the conventional arrangement as described above, however, it is very possible that spot information showing a current location of the vehicle on the display would deviate from a predetermined course of travel due to an accumulated error in detection resulting from a possible drift of the gyroscope while the vehicle is travelling, to such an extent that such information would indicate an erroneous location of the vehicle on the display screen which includes a map of complicated and crowded roads and streets. Therefore, it is very difficult if not impossible for the driver of the vehicle to determine whether the displayed information on the screen is erroneous or if his vehicle is actually travelling along a different or wrong course, thus resulting in substantial ambiguity.

The present invention is essentially directed towards overcoming the foregoing inconvenience and difficulties attendant the conventional travel route indication apparatus, which problems have not heretofore been satisfactorily overcome.

SUMMARY OF THE INVENTION

A principal object of the present invention is to provide an improved travel route indicating apparatus for use in an automotive vehicle which can effectively minimize ambiguity in the visual display of a current location of the vehicle.

It is another object of the present invention to provide an improved vehicle travel route indicating apparatus which can provide a visual indication of a current location of the vehicle by way of a continuous path of travel and a sense mark at the top of the continuous path, thus enabling a ready comparison with a preselected road pattern on the display at the time of inspection thereof.

Another object of the present invention is to provide an improved vehicle travel route indicating apparatus which provides a visual indication of a retrieval mark along the path of travel, thus enabling a ready analysis of a possible deviation from a preselected course of travel at a current point of inspection.

In accordance with the present invention, there is provided an improved travel route indicating apparatus for use in an automotive vehicle which can provide not only a visual indication of a current location of the vehicle by way of spot information, but also a continuous visual indication of a path of travel of the vehicle for a given area of travel from a predetermined point to a current position thereof, whereby even if the location of the vehicle at a given moment as indicated visually on the display screen should deviate from the preselected course of travel on the road map or pattern on the display screen due to a possible error in detection as described hereinabove, the driver of the vehicle may compare the continuously indicated path of travel as indicated up to the moment of inspection by the driver to the pattern of roads on the map on the display, thus making it possible to readily determine which direction the vehicle should travel.

The above and further objects, features, advantages and details of the present invention will become more apparent from the following detailed description when read in conjunction with the accompanying drawings, in which like parts are designated by like reference numerals.

DETAILED DESCRIPTION OF PREFERRED EMBODIMENTS

Figure 1:
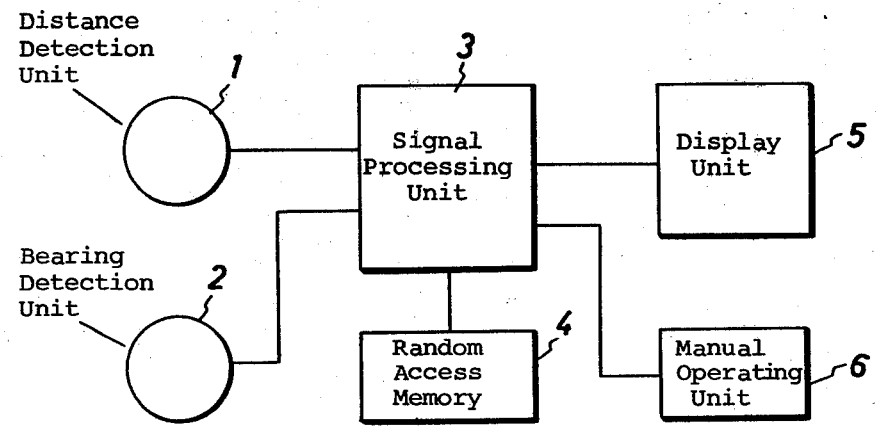
FIG. 1 is a schematic block diagram generally showing a preferred embodiment of a travel route indicating apparatus according to the invention.

With reference to FIG. 1, there is schematically shown the basic circuit construction of a travel route indicating apparatus according to the present invention which comprises a distance detection unit 1 which is adapted to generate an electric signal corresponding to a current travel distance of a vehicle. The distance detection unit 1 includes a sensor and pulse generator which may comprise a photoelectric, electromagnetic or mechanical contact type generator for generating electric pulses proportional to, for example, the number of revolutions of the vehicle's wheel. A bearing detection unit 2 is provided for outputting an electric signal proportional to a current bearing or a current amount of azimuthal deviation of the vehicle corresponding to the direction of travel thereof at the given moment with respect to a predetermined reference including, for example, a rate gyroscope adapted to detect an angular velocity in the yawing plane. A signal processing unit or central processing unit (CPU) 3 is adapted to count the electric pulses from the distance detection unit 1 so as to measure the current travel distance of the vehicle, determine the current direction of travel of the vehicle from the output of the bearing detection unit 2, and arithmetically obtain a current position on the two-dimensional coordinates at an interval of a unit travel distance of the vehicle in accordance with the detection signals from both detection units 1 and 2, while centrally controlling the entire apparatus. A path of travel storage unit or random access memory (RAM) 4 is adapted to sequentially store data on the distance positions or spots on the two-dimensional coordinates which vary from time to time and are obtained by the signal processing unit 3, and to store the data as finite and continuous information on the positions corresponding to the current location of the vehicle. A display unit 5 including a CRT display, a liquid crystal display, etc., is adapted to visually indicate information as updated from time to time such as a current travel distance of the vehicle, a path of travel for a given zone to the current location, and a current direction of travel and the time required in accordance with the output from the signal processing unit 3. A manual operating unit 6 is adapted to appropriately modify the settings such as of a directional change of the path of travel of the vehicle as visually indicated on the display unit 5, a shift of the position of such indication, a partially enlarged indication of the path of travel, a manual selection of a scale of indication, etc.

The operation of the above-described vehicle travel route indication apparatus according to the invention will be described in detail hereinbelow.

In operation, a predetermined starting or reference point of the vehicle motion and a desired scale of indication are first manually preset on the display unit 5 in accordance with the road map displayed thereon by using the manual operating unit 6. Thereafter, and when the vehicle travel begins, a single electric pulse signal is sent at an interval of unit travel distance from the distance detection unit 1 to the signal processing unit 3, where the number of pulses is counted so as to measure a current travel distance of the vehicle, while also sending the output from bearing detection unit 2 to signal processing unit 3 so as to determine a current cruising direction or azimuth of the vehicle at each moment. The signal processing unit 3, as described above, operates to arithmetically obtain from time to time a current location or graphic point (x, y) on the X-Y coordinates in the preselected scale of indication on the display unit 5 in accordance with the current travel distance and azimuthal deviation of the vehicle detected as described above. The results of such operation are sequentially sent to the display unit 5, and also to the path of travel storage unit (RAM) 4 so as to be stored therein. The thus-stored data is continuously read out to be fed into the display unit 5, and at the same time, an azimuthal signal at a current location of the vehicle is sequentially sent out from the signal processing unit 3 to the display unit 5.

Figure 2:
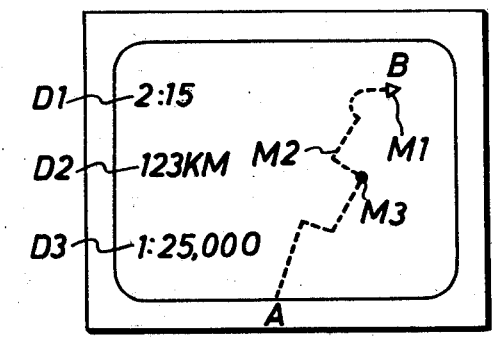
FIG. 2 is a schematic view showing a typical visual indication on a display unit for use with the embodiment of the invention shown in FIG. 1.

More specifically, as shown in FIG. 2, the aforesaid inputs to display unit 5 from both the path of travel storage unit 4 and signal processing unit 3 are adapted to be visually indicated on the display unit 5 by way of an azimuthal indication mark M1 appearing at the current location B of the vehicle and a path of travel indication mark M2 showing the path of travel from the predetermined starting or reference point A to the current location B of the vehicle in a simulated manner to follow the travel route of the vehicle. In this connection, in order to verify whether or not the actual path of travel of the vehicle up to a current point in time complies with the desired path of travel, a retrieval mark M3 is provided for placing anywhere along the path of travel indication mark M2 indicated on the display unit 5 upon manual operation of the manual operating unit 6.

On the other hand, the display unit 5 is also arranged, as exemplified in FIG. 2, to permit indication of additional auxiliary information in accordance with the signals supplied from the signal processing unit 3, such as an indication of time D1 required for vehicle travel from a predetermined reference point to the current location B (which may be adapted by use of a suitable timer incorporated in the signal processing unit 3 so as to function during the time period that the vehicle travels), an indication of the current total mileage D2 up to location B, or an indication of a selected display scale D3 selected by way of the manual operating unit 6 as desired.

Because there is a physical or spatial limit in the visual indication of the path of travel of the vehicle on the display screen having a finite display area, when the path of vehicle travel extends out of such limit of the display screen as vehicle travel proceeds, a new starting or reference point A' is set on the display unit 5 by the manual operating unit 6 to permit a fresh indication display, and this procedure may be repeated as often as desired. In this connection, a limit frame (not shown) may be arranged to define a single indication display on the display screen, and when the current location B of the vehicle reaches such limit frame on the display screen, a warning is immediately given to the driver of the vehicle. More specifically, there are preset maximum values in both the X and Y axes of coordinates corresponding to the frame area of indication limit in the signal processing unit 3, thus enabling an alarm to function with a warning input to be produced upon reaching either of these maximum values by the current location point (x, y) of the vehicle. It will also be understood that the driver may provide the signal processing unit 3 with an indication command on the display unit 5 through the manual operating unit 6 when so desired, whereupon the content in the path of travel storage unit 4 is read out to be indicated on the display accordingly, instead of the constant indication of the path of travel on the display unit 5 as described above.

As described hereinabove, the apparatus in accordance with the present invention permits the driver of the vehicle to readily and assuredly identify his vehicle travel route by comparing a current path of travel as visually indicated on the screen of display unit 5 to the pattern of a road on the map shown on the display screen. Even if there has been an accumulated error from a relatively long travel distance of the vehicle up to the moment of inspection by the driver, when a portion of the path of travel is specifically compared with reference to a corresponding pattern of a road route to be taken by the vehicle, particularly where there is a specific feature such as the last curve shown in FIG. 2, only the accumulated error after that particular road pattern is to be noted, thus enabling the driver of the vehicle to determine his location at that moment more precisely, yet with an easy approximation.

In addition, by virtue of the advantageous feature that the path of travel of the vehicle is held continuously in the visual indication for a given extension or zone that has been travelled by the vehicle, it is concurrently possible for the driver of the vehicle to generally determine the undesired deviation in the actual travel of his vehicle, if any, in terms of either distance or orientation away from the desired or predetermined path of travel. Also, the driver can determine a current location of the vehicle more efficiently and assuredly by changing of the indication scale of the path of travel on the display screen, justifying the thus-obtained indication on the due course of travel on the map indicated on the display screen, selectively rotating the orientation of the indication on the display to suit the current direction of travel, or enlarging the particular points passed by the vehicle, as desired.

Figure 3:
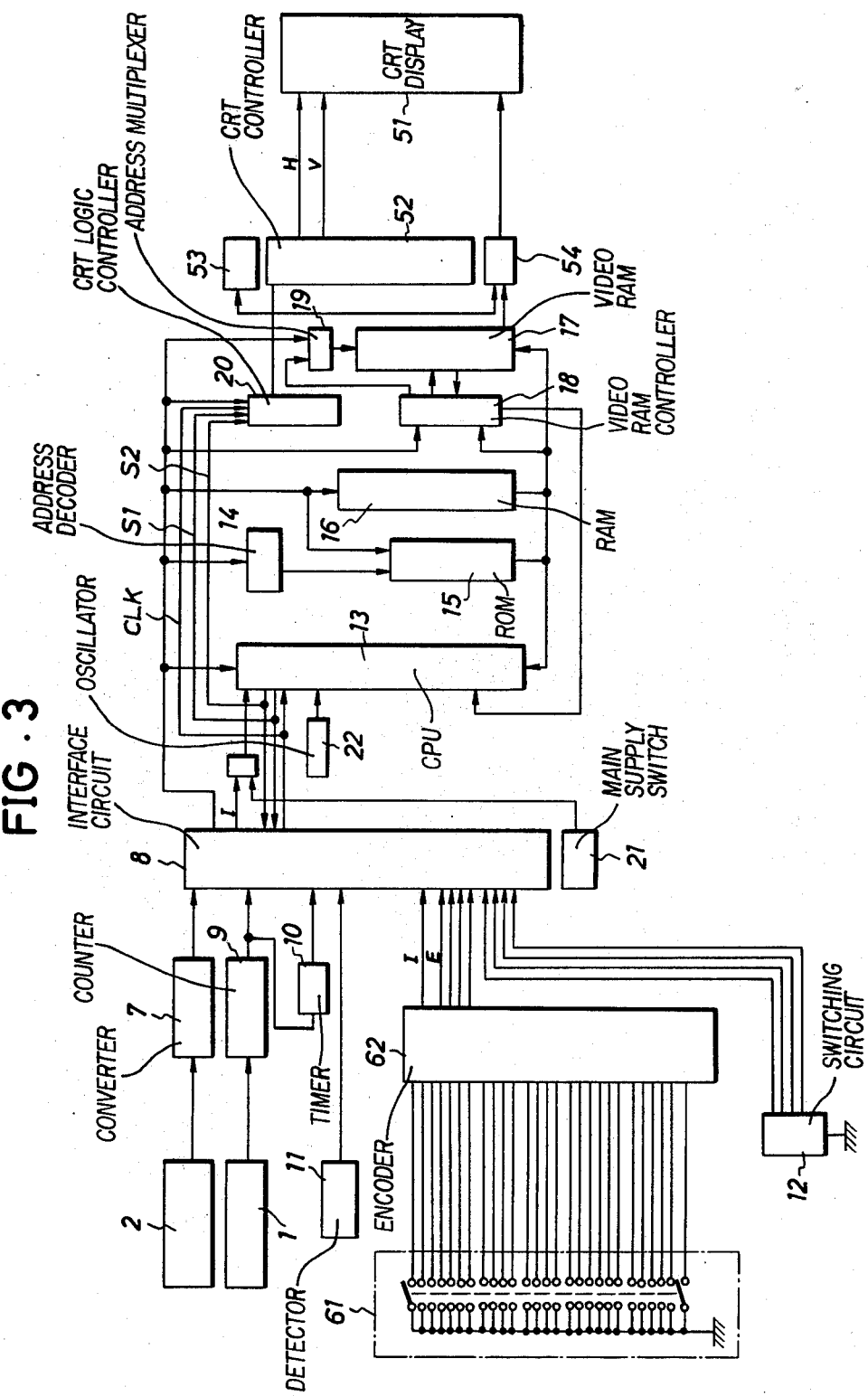
FIG. 3 is a block diagram showing a general circuit construction of the invention.

With reference to FIG. 3, there is generally shown the construction of the vehicle travel route indicating apparatus in accordance with a preferred embodiment of the present invention. With such construction, in operation, a rate output from the bearing detection unit 2 is fed to an interface circuit 8 through an analog-to-digital (A/D) converter 7, and the number of output pulses from the distance detection unit 1 is counted by a counter 9, the result of which is transferred to the interface circuit 8. A timer 10 is connected in series with the output of counter 9, which timer is adapted to detect that the vehicle is standing still when the counter 9 is not operating for a given period of time. Also, there is provided a detector 11 for detecting the forward and rearward movement of the vehicle, which is adapted, upon the detection of rearward movement of the vehicle, to deliver the detection signal to the interface circuit 8 during which each of the inputs from the bearing detection unit 2 is inverted.

The manual operating unit 6 comprises a group of operating input selecting switches 61 and an operating input encoder 62 (by way of priority encoding) adapted to feed various command signals to the interface circuit 8 in accordance with the combination of contacts of the group of switches 61. In FIG. 3, an interrupt operation signal is shown at I, and an encode output is shown at E. A digital switching circuit 12 is provided for adjustment of sensitivity on the input to the interface circuit 8, so that a possible undesirable dispersion due to wear, misalignment, etc., in the elements on the input of the circuit may be compensated for accordingly.

The signal processing unit 3 comprises a CPU 13 for centrally controlling the apparatus, an address decoder 14 for decoding the addresses as specified by the CPU 13, a ROM 15 for reading out a predetermined control program stored preliminarily in accordance with the output from the decoder 14 for sending the thus-obtained data fed to the CPU 13, a RAM 16 for storing location data on the X-Y coordinates in accordance with rate detection and distance detection values or auxiliary indication data such as on the current travel distance, a video RAM controller 18 and an address multiplexer 19 for storing data read out from RAM 16 in accordance with the addresses fed from CPU 13 at a video RAM 17 serving as the path of travel storage unit 4 described above, and a CRT logic controller 20.

Also shown in FIG. 3 are a main supply switch 21 interconnected to, for example, the ignition switch of the automotive vehicle, and an oscillator 22 for controlling the clock signals of CPU 13, respectively. Also, CLK designates the clock signals for the series communication, S1 designates the series communication output, and S2 designates the series communication input, respectively.

The display unit 5 may comprise a CRT controller 52 adapted to send both horizontal and vertical synchronizing signals H and V to a CRT display 51 in accordance with the commands from the CRT logic controller 20, and a shift register 54 adapted to send the data read out from the video RAM 17 to the CRT display 51 in synchronism with the clock signals from the CRT clock oscillator 53.

In connection with a second embodiment of the present invention, because the overall construction and operation thereof is similar to the above-described first embodiment, for purposes of brevity the following description is restricted to only that part of the construction and operation of the second embodiment which differs from that of the first embodiment of the invention.

According to the general construction of the invention which comprises, as described hereinabove, the first and second detection units for detecting current travel distance and bearing of the vehicle, respectively, the signal processing unit for obtaining arithmetically the current location of the vehicle in terms of the two-dimensional coordinates, the path of travel storage unit for storing the continuous information on shifting of the vehicle's locations from time to time, the display unit for visually indicating the continuous path of travel of the vehicle and the sense mark showing the heading or bearing thereof, and the manual operating unit for optionally changing the manner of visual indication settings on the display unit, there is provided a modification of the invention by way of a second embodiment thereof wherein there is provided a heading or bearing mark indication at the top of the continual indication tracing the path of travel of the vehicle, in addition to the setting and change in the visual indication on the display unit 5 relating to such factors as the directional change of the path of travel of the vehicle, the shift of the position of such indication, the partially enlarged indication of the path of travel, the manual selection of a scale of indication, etc.

With such arrangement in the second embodiment of the invention, in connection with the arrangement of simulated indication following the actual status of travel of the vehicle on the display unit 5, the indication mark M1 on the current location B of the vehicle may be such that there is provided a ROM in the signal processing unit 3 which stores mark information such as, for example, a plurality of arrows with triangular heads having various directivities or senses of travel, so that particular marking information having an appropriate direction of travel in accordance with an address so given may access an appropriate bearing detection signal so as to be delivered to the display unit 5. In this manner, there is displayed a triangular pointer mark at the top of the indication of the current path of travel M2, and thus the current location B of the vehicle, so as to indicate the due heading or bearing of the vehicle at the current location B on the display screen.

As described hereinabove, according to the present invention there is provided an improved vehicle travel route indicating apparatus which comprises, in combination, the first detection means adapted to detect a current distance of travel of the vehicle, the second detection means adapted to detect a current bearing taken by the vehicle, the signal processing means adapted to arithmetically obtain a current location in terms of two-dimensional coordinates at a given unit interval of travel distance of the vehicle on the basis of outputs from the first and second detection means, the path of travel storage means adapted to store data on current locations in terms of the two-dimensional coordinates varying from time to time as obtained from the signal processing means and to hold contents obtained as a continual information on the current location of the vehicle, the display means adapted to display on the display screen thereof the path of travel of the vehicle in accordance with the thus-obtained data in the storage means, and the manual operating means adapted to set and change the phases of indication on the display means. Accordingly, the driver of an automotive vehicle can incessantly determine the current status of travel of his vehicle in terms of distance as well as bearing, and is thus able to drive following the first-hand information as displayed at his seat more efficiently and precisely than with the conventional arrangement. At the same time, the apparatus in accordance with the present invention has a simplified construction in comparison with conventional arrangements.

Although there have been described what are at present considered to be the preferred embodiments of the invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

We claim:

1. A travel route indication apparatus for use in an automotive vehicle, comprising:
   first detection means for detecting a current distance of travel of said vehicle;
   second detection means for detecting a current bearing of said vehicle;
   signal processing means, connected with said first and second detection means, for arithmetically obtaining a current location in terms of two-dimensional coordinates at an interval of a given unit of travel distance of the vehicle based on outputs received from said first and second detection means;
   path of travel storage means, connected with said signal processing means, for storing data on current locations in terms of two-dimensional coordinates varying from time to time as obtained from said signal processing means and for holding contents obtained as continual information on said current location of said vehicle;
   display means, connected with said storage means, for displaying on a screen thereof the continuous path of travel of said vehicle from a predetermined point to a current position thereof in accordance with the data in said storage means;
   said display means being adapted to visually indicate by way of an indication mark which simultaneously indicates both said current position of said vehicle and a sense or directivity to visually show a current direction of travel of said vehicle throughout a range of 360° and directly in accordance with current bearing detection signals from said second detection means;
   said indication mark on said screen being updated at all times on the basis of said outputs from said second detection means;
   manual operating means for setting and changing the phases of visual indication on said display means, said phases including a directivity of said indication mark, a direction of the visually-indicated path of travel of said vehicle, a shift of the position of said visual indication and a selected scale of indication; and
   said apparatus being adapted to be installed in said vehicle so as to function as a complete and self-contained travel route indication apparatus for said vehicle.

2. A travel route indication apparatus according to claim 1, wherein:
   said manual operating means is adapted to visually indicate an optional retrieval mark anywhere along the visual indication of said path of travel of said vehicle shown on the display screen of said display means upon the receipt of an arbitrary command given to said manual operating means.

3. A travel route indication apparatus according to claim 1, wherein:
   said display means comprises a CRT display.

* * * * *